United States Patent
Johanson

(10) Patent No.: US 11,631,505 B2
(45) Date of Patent: Apr. 18, 2023

(54) CUNISI ALLOY CABLE SHEATHING

(71) Applicant: NEXANS, Courbevoie (FR)

(72) Inventor: Audun Johanson, Oslo (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/992,735

(22) Filed: Aug. 13, 2020

(65) Prior Publication Data

US 2021/0391098 A1    Dec. 16, 2021

(30) Foreign Application Priority Data

Aug. 26, 2019  (EP) .................................... 19306032

(51) Int. Cl.
*H01B 9/02* (2006.01)
*H01B 1/02* (2006.01)
*H01B 7/14* (2006.01)
*H01B 7/28* (2006.01)
*H01B 7/282* (2006.01)

(52) U.S. Cl.
CPC .............. *H01B 9/02* (2013.01); *H01B 1/026* (2013.01); *H01B 7/14* (2013.01); *H01B 7/2806* (2013.01); *H01B 7/2825* (2013.01)

(58) Field of Classification Search
CPC . H01B 1/026; H01B 7/02; H01B 7/04; H01B 7/14; H01B 7/20; H01B 7/28; H01B 7/2806; H01B 7/2825; H01B 9/006; H01B 9/02; H01B 11/02; H01B 13/22; H01B 13/26
USPC .... 174/102 R, 102 A, 104, 105 R, 108, 109, 174/110 R, 113 R
See application file for complete search history.

(56) References Cited

U.S. PATENT DOCUMENTS

| | | | | |
|---|---|---|---|---|
| 5,486,648 A | * | 1/1996 | Chan | H01B 7/288 174/105 SC |
| 5,675,883 A | * | 10/1997 | Gaag | C22F 1/08 29/527.7 |
| 2005/0077074 A1 | * | 4/2005 | Tanaka | H01B 7/0861 174/117 F |
| 2012/0024565 A1 | * | 2/2012 | Orini | H01B 7/14 174/106 R |
| 2014/0030884 A1 | * | 1/2014 | Rouh | H01L 21/32137 438/592 |
| 2014/0060884 A1 | * | 3/2014 | Patel | H01B 7/2825 174/102 A |
| 2015/0101843 A1 | * | 4/2015 | Olsen | H01B 7/285 174/109 |
| 2016/0141076 A1 | * | 5/2016 | Perego | H01B 13/2613 427/455 |
| 2016/0276066 A1 | * | 9/2016 | Perego | H01B 7/14 |
| 2018/0374613 A1 | | 12/2018 | Zymelka | |
| 2019/0066871 A1 | | 2/2019 | Johanson | |

FOREIGN PATENT DOCUMENTS

CN    104 694 780    6/2015

OTHER PUBLICATIONS

EU Search Report dated Jan. 16, 2020.

* cited by examiner

*Primary Examiner* — William H. Mayo, III
(74) *Attorney, Agent, or Firm* — Sofer & Haroun, LLP

(57) ABSTRACT

A water blocking layer/sheathing for subsea power cables made from a CuNiSi-alloy.

8 Claims, 3 Drawing Sheets

CUNISI ALLOY CABLE SHEATHING

RELATED APPLICATION

This application claims the benefit of priority from European Patent Application No. 19 306 032.4, filed on Aug. 26, 2019, the entirety of which is incorporated by reference.

FIELD OF THE INVENTION

The present invention relates to a water blocking layer/sheathing for subsea power cables.

BACKGROUND

As the world's maritime infrastructure is developing, the use of submarine cables to deliver electric power below, above, in or across bodies of water is rapidly increasing. Such submarine power cables are slender structures and are commonly suspended between a floating unit located at the surface of a body of water, from where electric power is typically delivered to equipment on the seabed.

PRIOR ART

A power cable typically consists of one or more conductors of electricity, each being electrically insulated by a dielectric/insulating material radially arranged around the conductor. Then follows an inner sheathing protecting the conductor and its insulation from water intrusion, corrosive attacks etc. Depending on type and intended use of the power cable, the inner sheathing may either be applied around each conductor and its insulation or it may be one common inner sheathing encompassing all conductors of the cable with their insulation. The power cable further typically comprises a tubular over-sheath encompassing the inner sheathing and the one or more conductors and their insulation. The over-sheath may typically comprise an armouring (often made of intertwined steel wires etc.) and an outer sheathing (often a polymer material). These are the typical minimum of components necessary to make a functional power cable with comparable high electric power transferring capacity. However, a power cable may, also comprise one or more additional components depending on the intended properties and functionalities of the power cable.

The inner sheathing of submarine power cables should provide both excellent water barrier properties blocking out any intrusion of water and/or moisture to the conductor and/or insulation of the one or more conductors and sufficient mechanical endurance/resilience ensuring the water barrier property of the inner sheathing remains intact during the desired lifetime of the cable. The inner sheathing may further, advantageously, be electrically conducting to function as an emergency-earthing conductor of electric charges to ground in case short-circuit currents arises in the cable and/or to carry eventual capacitive charging currents to ground.

A commonly applied material for forming the inner sheathing for submarine power cables is lead and lead alloys. Sheathings of lead/lead alloys are relatively flexible and easily manufactured but lead/lead alloys have a relatively low fatigue resistance. US patent application US 2014/0060884 is an example of prior art showing use of lead and copper in the inner sheathing of submarine power cables. The document informs however that these materials have shown less satisfactory resistance towards fatigue and may thus be subject to cracking when applied in heavier cables and/or in dynamic applications.

It is further known to make the inner sheathing from a corrugated copper alloy or corrugated aluminium alloy, which provides the inner sheathing with higher fatigue resistance. A corrugated tubular sheathing cannot be made by extrusion and must instead be welded from a metallic sheet comprising the alloy, to form a continuous water barrier layer around a cable core. However, the corrugation process is slow, poses a risk to the integrity of the water barrier layer and is very detrimental to the overall design of the submarine cable, as the diameter of the water barrier layer is drastically increased during corrugation. A corrugated water barrier layer therefore heavily increases the cost of manufacture and deployment of a submarine power cable.

One known solution to this problem is to use a copper alloy or a copper nickel alloy. A water barrier layer comprising a Cu- or CuNi-alloy exhibits relatively high fatigue resistance from cyclical mechanical loads caused by wave motions and water currents and may therefore require less corrugation. European patent application EP 2 312 91A1 discloses the use of a longitudinally welded copper sheath covered by an adhesive semi-conductive layer. EP 2 706 539 B1 discloses the use of various alloys, including CuNi-alloys, and a method of manufacturing a cable by welding a metallic sheet to form a continuous water barrier layer/inner sheathing around a cable core. EP 3 438 993A1 discloses the use of CuNi-alloys where the expected drop in longitudinal weld fatigue properties is limited by conducting the welding by autogenous laser welding.

Other known solutions include using steel sheathing such as 304 or 316 stainless steel.

European patent EP 1 793 390 B1 teaches use of various types of copper or copper alloys as the peripheral element of electric wires for automobiles. Pure copper, Cu—Ni—Si alloy, Cu—Sn alloy, Cu—Cr—Zr alloy or the like are described as desirable for providing improved tensile strength and a smaller diameter of the electric wires.

OBJECTIVE OF THE INVENTION

The main objective of the invention is the provision of a low-cost and light weight dry-design subsea power cable having excellent fatigue properties.

DESCRIPTION OF THE INVENTION

In a first aspect, the present invention relates to a power cable (1), comprising:
  an electric conductor (2),
  an electric insulating material (3) enclosing the electric conductor (2), and
  an inner sheathing (4) enclosing the electric insulating material (3) enclosing the electric conductor (2),
characterised in that
  the inner sheathing (4) is made of a CuNiSi-alloy.

The term "electric conductor" as used herein refers to the current carrying inner core of the power cable. The invention may apply any known or conceivable current carrying inner core known to the skilled person being suited to carry/transport electric current, including but not limited to a single strand of an electrically conductive material, a plurality of strands of an electrically conductive material arranged in a bunt, etc. In the latter case of applying an electric conductor comprising a bunt of strands, the space in-between the strands of electrically conductive material may be occupied by a semiconducting filler compound. The electric conductor may in further example embodiments also comprise a semi-conducting conductor screen arranged radially around and encompassing the single strand or bunt of strands. Examples of materials being suited as the current carrying strand(s) of the electric conductor of power cables include, but are not limited to; Cu, Cu-alloy, Al, or an Al-alloy. In practice, the electrically conductive material being applied as conductor(s) in power cables may advantageously have an electric conductivity of at least $4.8 \cdot 10^6$ S/m at 20° C., preferably of at least $1.0 \cdot 10^7$ S/m at 20° C. and most preferably of at least $3.6 \cdot 10^7$ S/m at 20° C.

Each conductor of power cables should be individually electrically insulated. This is typically obtained by covering the surface of the conductor by a layer of an electric insulating material, i.e. to make the conductor being sheathed in the electrically insulating material. The invention may apply any known or conceivable material, including dielectric materials, known to the skilled person as being suited as insulation of the current carrying conductor(s) of power cables. In practice the electric conductivity of the material being applied as insulation may advantageously have an electric conductivity of less than $10^{-14}$ S/m at 20° C., preferably less than $10^{-16}$ S/m at 20° C., preferably less than $10^{-18}$ S/m at 20° C., and most preferably less than $10^{-20}$ S/m at 20° C. Examples of materials suited for being applied to form the electric insulation of the conductor(s) include, but are not limited to; ethylene propylene rubber (EPR), ethylene propylene diene monomer (EDPM), rubber, polyethylene (EP), polypropylene (PP), polyurethane (PUR), cross-linked polyethylene (XLPE), and mass-impregnated (MI) paper. The insulation effect of the insulating material depends on the thickness of the layer of insulating material. In general, the higher voltage of the electric current in the conductor, the more insulation is needed. The determination of amount of insulating material required to electrically insulate a conductor is within the ordinary skills of the person skilled in the art.

The electric conductors and their electric insulation should be protected towards intrusion of water/moisture. An ingress of moisture into the core can lead to a failure of the cable. Thus, the inner sheathing of submarine power cables should be excellent water barriers able to completely block any intrusion of water and/or moisture to the conductor(s) and its(their) electric insulation for the duration of its design life. Furthermore, the inner sheathing of subsea cables should endure any movements imposed on the cable by wave motions, under water currents etc. without fatigue, unintended separation between the layers, cracking or any other mechanical breakdown destroying the water barrier function of the inner sheathing during the desired lifetime of the power cable, which may be many years. The inner sheathing may advantageously also function as an emergency earthing conductor leading eventual short circuit currents and/or eventual capacitive charging currents in the power cable to ground. I.e. there are rather stringent mechanical requirements imposed on the inner sheathing of power cables such that the inner sheathing is usually a metallic tube of sufficient diameter to house at least the electrically insulated conductor(s).

In the present invention, the inner sheathing (4) applied to protect the electric conductor (2) and the electric insulating material (3) is made of at least a layer of CuNiSi-alloy being laid around and formed into a tight enclosure. CuNiSi-alloys are relatively lightweight alloys having good electric conductivity, good corrosion resistance and good mechanical properties making the alloy suitable for being applied as the inner sheathing of power cables, including subsea power cables.

The inner sheathing (4) of the power cable according to the invention may, in one example embodiment, advantageously have a composition of:
either:
from 0.8 to 30 weight % Ni, from 0.1 to 2 weight % Si, from 0.1 to 1.5 weight % Fe, and from 0.1 to 1.5 weight % Mn, based on the total mass of the alloy,
or
from 2.6 to 4.5 weight % Ni, from 0.8 to 1.3 weight % Si, from 0.1 to 1.5 weight % Fe, and from 0.1 to 1.5 weight % Mn, based on the total mass of the alloy,
or
from 0.8 to 1.8 weight % Ni, from 0.15 to 0.35 weight % Si, from 0.1 to 1.5 weight % Fe, and from 0.1 to 1.5 weight % Mn, based on the total mass of the alloy,
or
of 2.25 weight % Ni, of 0.65 weight % Si, from 0.1 to 1.5 weight % Fe, and from 0.1 to 1.5 weight % Mn, based on the total mass of the alloy,
and
the rest being Cu and unavoidable impurities.

The amount of material, i.e. the thickness of the inner sheathing (4) (determined as the shortest distance between the inner and outer surface of the sheathing), may depend on the dimensions of the power cable, electric loading, the expected physical and chemical loads/strains induced by the environment of the power cable, and other factors. The present invention may apply a CuSiNi-alloy sheathing having any thickness being suited for use as the inner sheathing of power cables. The determination of amount of the CuSiNi-alloy/thickness of the inner sheathing is within the ordinary skills of the person skilled in the art. In practice, the thickness of the inner sheathing (4) may typically be in the range of from 0.01 to 1 mm, preferably of from 0.01 to 0.75 mm, more preferably from 0.01 to 0.25 mm, more preferably of from 0.01 to 0.10 mm, more preferably of from 0.01 to 0.05 mm, and most preferably of from 0.02 to 0.05 mm.

The addition of both Si and Ni in the Cu matrix provides a CuSiNi-alloy precursor sheet which when subjected to a suitable thermo-mechanical treatment, provides an inner sheathing with improved water barrier properties as compared to prior art Pb, Cu, Al, or CuNi25-based sheathings due to several effects of these additions; Si forms oxides in the weld zone and reduces porosity in the weld, Si and Ni improves fluidity and weld microstructure, Ni provides solid solution strengthening in weld and base material, Ni increases thermal resistance to reduce geometrical distortion and reduces the heat affected zone when subjected to any welding process, and Ni increases reflectivity to improve autogenous laser welding. Combination of Ni and SI when subjected to the correct thermo-mechanical history provides strengthening precipitates. The example embodiments of the inner sheathing made from a CuSiNi-alloy containing Fe and Mn has further the benefit of improved corrosion resistance from the Fe and the Mn acting as deoxidant. The CuSiNi-alloy has furthermore an improved fatigue resistance as compared to prior art CuNi25-alloys if the inner sheathing is joined by adhesive or other method not involving welding and improved fatigue resistance as compared to prior art Pb, Cu, and Al-based sheathings irrespective of being joined by welding or by adhesives.

An example embodiment of the power cable according to the invention is illustrated schematically in FIG. 1a). In this example embodiment, the electric conductor (2) consists of a single strand of an electrically conductive material being enclosed/-embedded in an electric insulating material (3) which is enclosed/encapsulated by an inner sheathing (4) made of a CuSiNi-alloy.

Power cables may in addition to the electric conductor, electric insulation and inner sheathing comprise further components/parts such as e.g. semi-conductive conductor screen laid onto the electric conductor (2), a semi-conductive insulation screen laid onto the electric insulation (3), a semi-conducting or insulating sheath-screening laid onto the inner sheathing (4), filler compounds, swellable tapes, etc., armouring, outer polymer sheath, fibre optical cables, extruded filler-elements, etc. The power cable according to the invention may further comprise any component known to the skilled person suited for use in subsea power cables. In many applications, the power cable may also comprise an outer sheathing providing further chemical and mechanical protection of the conductor(s) at the cable core.

As used herein, the term "cable core" refers to and encompasses all components associated with the conductor(s) of the power cable, i.e. at least the electric conductor (2) and its insulation (3) and inner sheathing (4), but also any other part/component associated with the conductor(s) being applied in the cable. In the simple example embodiment shown in FIG. 1a), the cable core consists of only a conductor (2), insulation (3) and the inner sheathing (4) made of a CuSiNi-alloy. In the example embodiment shown in FIG. 1b), the cable core (indicated by the stapled parenthesis marked with reference numeral 20) is encapsulated by an over-sheath (5) which in some example embodiments typically comprises an armouring and an outer polymer coating.

The power cable according to the invention may further comprise an over-sheath (5). The term "over-sheath" as used herein refers to all components of the power cable being located outside of the cable core. The power cable of the invention may apply any known or conceivable over-sheath known to the skilled person. The over-sheath may in one example embodiment comprise a bedding laid onto the inner sheathing, an armouring and an outer sheathing facing the ambient environment of the power cable. However, the invention is not tied to an over-sheath consisting of these three components, bedding, armouring and outer sheathing, but may further contain any additional component(s) known used in over-sheaths in various embodiments of power cables. The bedding is an intermediate layer between the inner sheathing and the armouring, which both typically are metallic, to avoid metal-to-metal contact and the potential mechanical and corrosive problems such contact may arise. The bedding may typically be made of fibrous materials such as e.g. jute or hessian tape. The invention may apply any known or conceivable material in the bedding known to the skilled person to be suited as bedding. The armouring is the main provider of mechanical strength and protection from mechanical injuries to the power cable, and is typically made from galvanized steel wires, steel tape, braid, sheath or low loss armour etc. The armouring will, due to being metallic, also function as emergency earthing conductor. The outer sheathing is applied on the armouring for overall mechanical, weather, chemical and electrical protection of the power cable. The invention may apply any known or conceivable material known to the skilled person suited as outer sheathing of power cables and may typically be e.g. a thermoplastic or a thermosetting material such as e.g. polyvinyl chloride (PVC) or a chlorosulphanated polyethylene (CSP), respectively. The above variations in the over-sheath, i.e. the bedding, armouring and/or the outer sheathing are familiar to the person skilled in the art.

The inner sheathing according to the invention may be manufactured by assembling all components associated with the conductor of the power cable and then folding a precursor sheet of the CuSiNi-alloy around the assembled core components and joining the ends of the folded CuSiNi-alloy precursor sheet by welding, by one of the following welding techniques; autogenous laser welding, tungsten inertial gas (TIG) welding, or high frequency induction welding. The welding may advantageously be made under an inert shielding gas such as He or Ar. The shielding gas should be practically free of hydrogen to avoid potential problems with hydrogen embrittlement. Alternatively, the precursor sheet of CuSiNi-alloy may be folded to give an overlap between its edges and joined by an adhesive, such as e.g. a linear low-density polyethylene which is commercially available under the trademark Yparex 9403 supplied by The Compound Company. After folding and joining the ends of the CuSiNi-alloy precursor sheet, the folded and joined precursor sheet is drawn to reduce its diameter. In one example embodiment, the surface of the folded, joined and compressed CuSiNi-alloy precursor sheet may be given a from 0.1 to 0.5 mm thick layers of an adhesive. The adhesive may either be electrically conductive or insulating. Then a polymer layer of thickness 0.1 to 5 mm may be applied as bedding. The thickness of the CuSiNi-alloy precursor sheet may, in one example embodiment, advantageously be in the range of from 0.05 to 1.0 mm, preferably of from 0.1 to 0.75 mm.

In co-pending European patent application EP 3 438 993 A1, it is described a method for forming a dynamic power cable having an inner sheathing made from a CuNi-alloy. This method is well suited for making the present power cable except for using a CiNiSi-alloy instead of the Cu—Ni-alloy to manufacturing the inner sheathing. Thus, the method defined in any of claims 1 to 11 and/or in paragraphs [0012] to [0019] of EP 3 438 993 A1 is hereby incorporated by reference.

The CuSiNi-alloy precursor sheet may, prior to be folded and forming the inner sheathing encompassing the components associated with the conductor, be subject to a solution annealing at 800-1000° C. for 60-180 minutes to solve the Ni and Si content in the Cu matrix followed by quenching and aging treatment by heating to a temperature of 400-500° C. for about 5 to 10 hours to precipitate Ni—Si causing hardening of the CuSiNi-alloy precursor sheet. During manufacturing of the precursor sheath, the sheath might be cold rolled prior to aging treatment.

DETAILED DESCRIPTION

The invention will be described further by way of example embodiments.

Example Embodiment 1

Figure 1A:
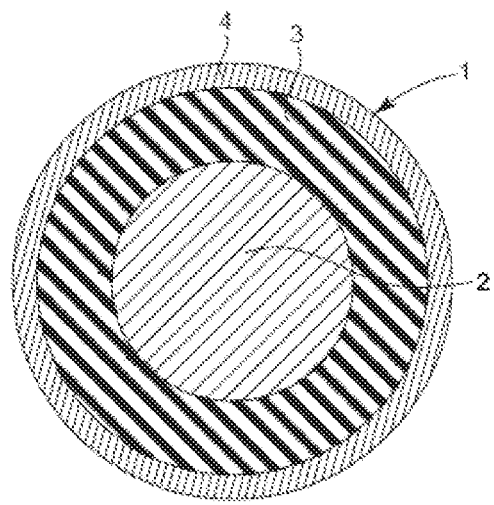
FIG. 1 is a drawing schematically illustrating a cross-section of an example embodiment of a single conductor power cable according to the invention.
Figure 1B:
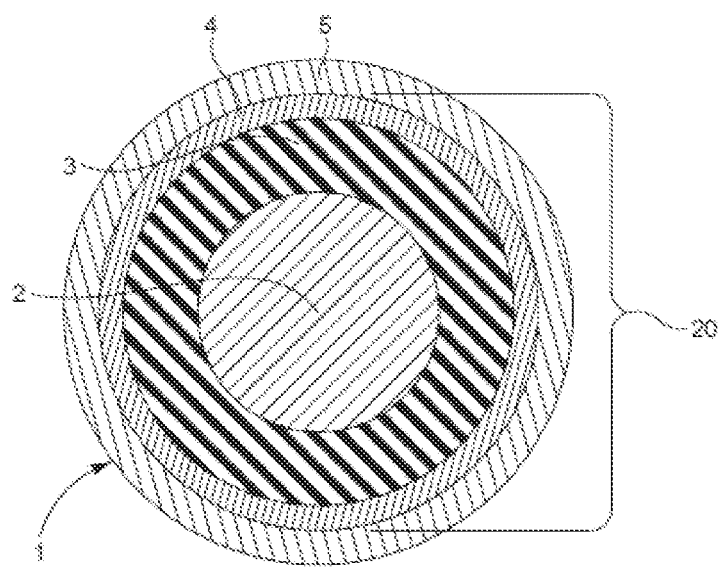
Figure 2A:
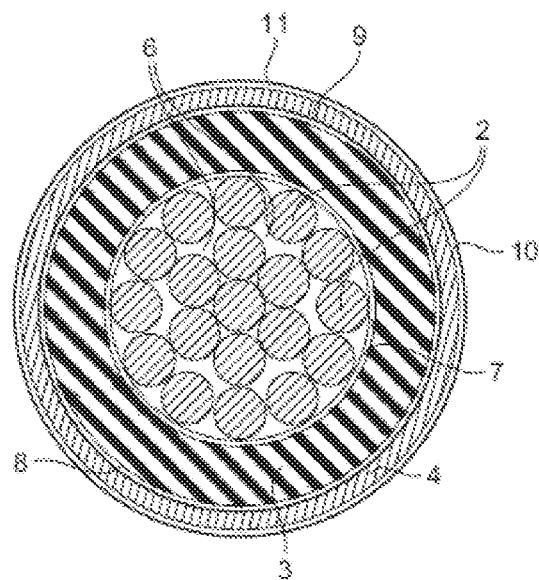
FIG. 2 is a drawing schematically illustrating a cross-section of another example embodiment of a single conductor power cable according to the invention.

Example embodiment 1 is a single-conductor power cable shown schematically in FIGS. 2a) and 2b). The figures show cross-sectional cut views. FIG. 2a) illustrates a single conductor constituting the cable core. The cable core comprises at its centre an electric conductor (2) made of 400 mm$^2$ of drawn and stranded wires of electrically conductive pitch (ETP) Cu. Alternatively, the strands of the conductor may be made of AA1370 aluminium alloys or AA6101 aluminium alloy. The electric conductor is impregnated by filling the space between the strands of the conductor with a commercially available water sealant (6), such as e.g. a silicone sealant, to provide longitudinal water blocking.

The electric conductor (2) is given a first semi-conductive polyethylene (PE) layer (7) of thickness 1.5 mm for mitigating electrical stress concentrations around the conductor. Then follows a 16 mm thick layer of cross-linked polyethylene (XLPE) as electric insulation (3). The XLPE layer is followed by a 1.5 mm thick second semi-conductive PE layer (8) to mitigate electrical stress concentrations. Then follows 2 layers of swellable tape (9) wrapped around the second semi-conductive layer (8) to prevent longitudinal water penetration. Then follows the inner sheathing (4).

The inner sheathing (4) of the this example embodiment is a 0.5 mm thick layer of CuNi$_{1.5}$Si$_{0.3}$-alloy formed by folding a sheet of the CuNi$_{1.5}$Si$_{0.3}$-alloy and made into a seamless tube by laser welding, and then compressed by moving the construction through a die with smaller inner diameter than the CuNi$_{1.5}$Si$_{0.3}$-alloy to a close fit, i.e. obtaining direct contact with the underlying electric insulation. An 0.2 mm thick layer (10) of an adhesive resin is extruded onto the CuNi$_{1.5}$Si$_{0.3}$-alloy sheath (4) followed by direct and tandem extrusion of a 3.5 mm thick high-density polyethylene (HDPE) sheath (11). Alternatively, the adhesive resin and the HDPE compounds are changed for similar compounds with small amounts of graphite to increase its conductivity. The multicomponent structure described above and drawn in FIG. 2a) completes the structure of a single conductor and constitutes the cable core of this example embodiment. The cable core is shown alone in FIG. 2a) and identified by the stapled parenthesis marked with reference number 20 in FIG. 2b).

Figure 2B:
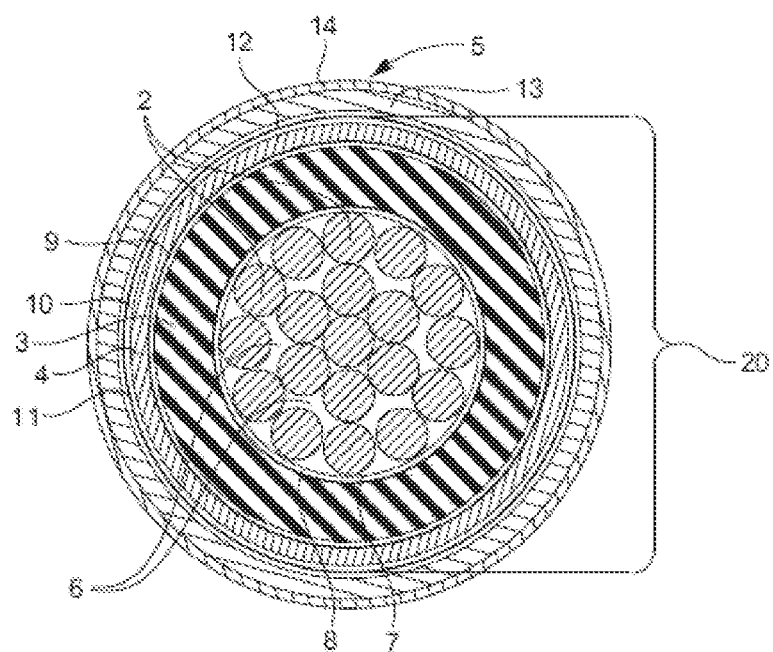

The single conductor/cable core is, as seen on FIG. 2b), given an over-sheath which in this example embodiment comprises a 0.2 mm thick layer of semi conductive anti-friction nylon tape (12). Then follows an armouring (13) made from a single layer of galvanized steel wires having a diameter of 3.0 mm. The steel wires are embedded in bitumen for corrosion protection. The over-sheath is completed by a 5.0 mm thick outer sheathing (14) of HDPE laid onto the armouring (13).

The example embodiment of the power cable has a compact and mechanically robust construction with a relatively small cross-sectional area as compared to prior art solutions. The example embodiment is well suited for use in deep-water submarine power cables by having, for all practical means, no hydrostatic pressure limit. The example embodiment is further relatively easy to manufacture enabling a fast production rate at relatively low-costs.

Due to the inner sheathing of CuNiSi-alloy exhibits a higher fatigue resistance than Cu- or Al-based inner sheathings, excellent resistance towards corrosion cracking provided welding is done correctly, increased electrical conductivity and reduced content of the relatively expensive Ni than CuNi25-based inner sheathings.

Example Embodiment 2

The second example embodiment of the invention is a single conductor power cable having a similar structure as the first example embodiment shown in FIGS. 2a) and 2b).

The single-conductor power cable has at the centre of the cable core (20) a conductor (2) made of 400 mm$^2$ conductor consisting of drawn and stranded wires of electrically though pitch (ETP) Cu, AA1370 aluminium alloys or AA6101 aluminium alloy. The conductor strands are impregnated in a silicone sealant (6) to provide longitudinal water blocking sealing and encapsulated by a first semi-conductive PE layer (7) of thickness 1.5 mm for mitigating electrical stress concentrations around the conductor. The first semi-conductive layer (7) is followed by a 16 mm thick layer of cross-linked polyethylene (XLPE) as electric insulation (3). The XLPE layer (3) is followed by a 1.5 mm thick second semi-conductive PE layer (8) to mitigate electrical stress concentrations and then 2 layers of swellable tape (9) which is wrapped around the second semi-conductive layer (8) to prevent longitudinal water penetration.

The inner sheathing (4) of this example embodiment is a prefabricated laminate consisting of three layers of thickness of 0.05 mm of a semi-conductive polymer and a CuNi$_{1.5}$Si$_{0.3}$-alloy. The CuNi$_{1.5}$Si$_{0.3}$ was subject to the heat treatment described above. The semi-conductive layers consist of a polymer-based material that bonds to the CuNi$_{1.5}$Si$_{0.3}$-alloy. The laminate is wrapped around the cable core where one edge overlaps the other with 20 mm. The overlapped edge is subjected to combined heat and pressure to re-melt and bond the overlapped laminate edges together. The fused region thereby represents a substantial diffusion path according to the overlapped length preventing water penetration for the design life of the cable. Then an 0.2 mm thick adhesive layer (10) of is extruded on to the wrapped and fused laminate (4) followed by direct and tandem extrusion of a 3.5 mm thick HDPE sheath (11).

The power cable of the second example embodiment has an over-sheath comprising a 0.2 mm thick layer (12) of semi-conductive anti-friction nylon tape, followed by an armouring (13) made from a single layer of galvanized steel wires having a diameter of 3.0 mm. The steel wires are embedded in bitumen for corrosion protection, and then a 5.0 mm thick layer of HDPE onto the armouring as the outer sheathing (14) of the power cable.

The example embodiment of the power cable has a compact and mechanically robust construction with a relatively small cross-sectional area as compared to prior art solutions. The example embodiment is well suited for use in deep-water submarine power cables by having, for all practical means, no hydrostatic pressure limit. The example embodiment is further relatively easy to manufacture enabling a fast production rate at relatively low-costs.

Due to the inner sheathing of CuNiSi-alloy exhibits a higher fatigue resistance than Cu- or Al-based inner sheathings (including other CuNi alloys), excellent resistance towards corrosion cracking, increased electrical conductivity and reduced content of the relatively expensive Ni than CuNi25-based inner sheathings.

Example Embodiment 3

Figure 3:
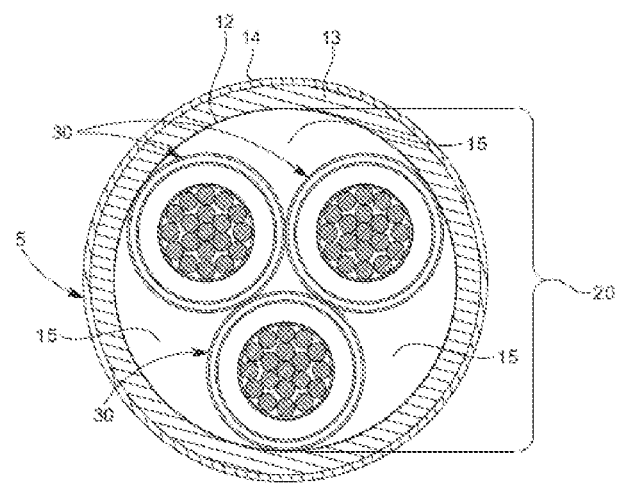
FIG. 3 is a drawing schematically illustrating a cross-section of an example embodiment of a three-conductor power cable according to the invention.

The second example embodiment of the invention is a three-conductor power cable illustrated schematically in FIG. 3. The figure is a cut-view of a cross section of the power cable as seen along the longitudinal centre axis of the cable.

The cable core of this example embodiment comprises a bundle of three conductors (30), each of the conductors (30) being similar to the single conductor/cable core of the single conductor power cable in example embodiment 1 or 2.

The over-sheath of this example embodiment has a circular cross section and comprises two inner layers (12) of nylon tapes and galvanized steel armouring is wrapped around the cable core and PE profile bundle. The steel wires of the armouring (13) are embedded in bitumen for corrosion protection. A 6.0 mm thick layer (14) of HDPE is laid onto the armouring as the outer sheathing.

The space (15) in the cable core in-between the over sheath and the three conductors (30) may be filled with a filler compound, extruded filler elements etc.

The example embodiment of the power cable has a compact and mechanically robust construction with a relatively small cross-sectional area as compared to prior art solutions. The example embodiment is well suited for use in deep-water submarine power cables by having, for all practical means, no hydrostatic pressure limit. The example embodiment is further relatively easy to manufacture enabling a fast production rate at relatively low-costs.

Due to the inner sheathing of CuNiSi-alloy exhibits a higher fatigue resistance than Cu- or Al-based inner sheathings (including other CuNi alloys), excellent resistance towards corrosion cracking, increased electrical conductivity and reduced content of the relatively expensive Ni than CuNi25-based inner sheathings.

The invention claimed is:

1. A power cable comprising:
   an electric conductor,
   an electric insulating material enclosing the electric conductor, and
   an inner sheathing enclosing the electric insulating material enclosing the electric conductor,
   wherein the inner sheathing is made of a CuNiSi-alloy,
   wherein the CuNiSi-alloy of the inner sheathing has a composition of:
   either:
      from 0.8 to 30 weight % Ni, from 0.1 to 2 weight % Si, from 0.1 to 1.5 weight % Fe, and from 0.1 to 1.5 weight % Mn, based on the total mass of the alloy, or
      from 2.6 to 4.5 weight % Ni, from 0.8 to 1.3 weight % Si, from 0.1 to 1.5 weight % Fe, and from 0.1 to 1.5 weight % Mn, based on the total mass of the alloy, or
      from 0.8 to 1.8 weight % Ni, from 0.15 to 0.35 weight % Si, from 0.1 to 1.5 weight % Fe, and from 0.1 to 1.5 weight % Mn, based on the total mass of the alloy, or
      of 2.25 weight % Ni, of 0.65 weight % Si, from 0.1 to 1.5 weight % Fe, and from 0.1 to 1.5 weight % Mn, based on the total mass of the alloy, and
   the rest being Cu and unavoidable impurities, wherein
      the electric conductor is made of drawn and stranded wires bundled together and impregnated by a water sealant and encapsulated in a semi-conductive polyethylene layer, and where the drawn and stranded wires are made of one of: electrically conductive pitch Cu, AA1370 aluminium alloys, or AA6101 aluminium alloy,
      the electric insulation is made of cross-linked polyethylene and encapsulated by a semi-conductive polyethylene layer followed by two layers of wrapped swellable tape, and
      the inner sheathing has a layer of adhesive followed by a layer of a high density polyethylene,
   and wherein
   the over-sheath of the power cable comprises:
      a layer of semi conductive anti-friction nylon tape laid onto a high density polyethylene layer,
      an armouring comprising a single layer of galvanized steel wires having a diameter of 3.0 mm embedded in bitumen, and
      a layer of a high density polyethylene laid onto the armouring.

2. The power cable according to claim 1, wherein the power cable further comprises an over-sheath encompassing the inner sheathing.

3. The power cable according to claim 1, wherein the inner sheathing has a thickness, determined as the shortest distance between an inner and an outer surface of the inner sheathing, in the range of from 0.01 to 1 mm.

4. The power cable according to claim 3, wherein the inner sheathing has a thickness, determined as the shortest distance between an inner and an outer surface of the inner sheathing, in the range of from 0.01 to 0.75 mm.

5. The power cable according to claim 3, wherein the inner sheathing has a thickness, determined as the shortest distance between an inner and an outer surface of the inner sheathing, in the range of from 0.01 to 0.25 mm.

6. The power cable according to claim 3, wherein the inner sheathing has a thickness, determined as the shortest distance between an inner and an outer surface of the inner sheathing, in the range of from 0.01 to 0.10 mm.

7. The power cable according to claim 3, wherein the inner sheathing has a thickness, determined as the shortest distance between an inner and an outer surface of the inner sheathing, in the range of from 0.01 to 0.05 mm.

8. The power cable according to claim 3, wherein the inner sheathing has a thickness, determined as the shortest distance between an inner and an outer surface of the inner sheathing, in the range of from 0.02 to 0.05 mm.

* * * * *